United States Patent Office 3,462,577
Patented Aug. 19, 1969

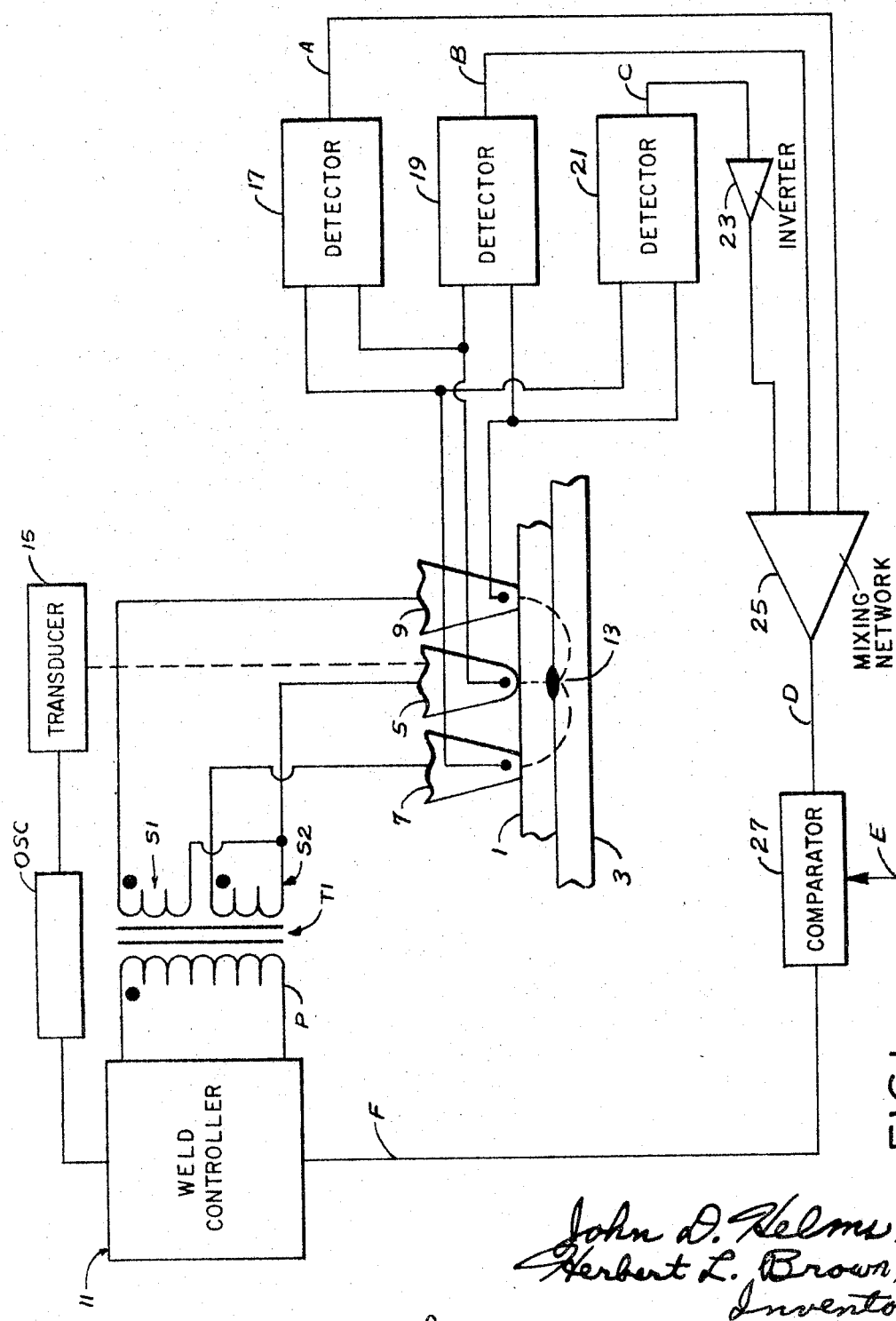

3,462,577
WELDING METHOD AND APPARATUS
John D. Helms, Farmers Branch, and Herbert L. Brown, Jr., Dallas, Tex., assignors to Texas Instruments Incorporated, Dallas, Tex., a corporation of Delaware
Filed Dec. 23, 1966, Ser. No. 604,257
Int. Cl. B23k 11/24
U.S. Cl. 219—78        12 Claims

ABSTRACT OF THE DISCLOSURE

Three electrodes are used for effecting so-called parallel-gap welding. One of the electrodes impresses a periodically varying force on the weld joint as it is being formed, thereby producing a periodically varying electrical resistance in the joint during its formation. This resistance decays as the weld is made, indicating completion of the weld. The joint resistance is monitored and, in response to the changing resistance, the weld voltage is increased, held constant for a predetermined time to effect optimum weld quality and then stopped.

BACKGROUND OF THE INVENTION

The invention relates to the welding art and, more particularly, to method and apparatus for effecting a high quality weld by testing the weld joint as it is being formed and by controlling the apparatus in response to the result of the test.

Welding apparatus may heretofore be operated on a cycle which is independent of the quality of the weld being formed. The Paugh United States Patent 1,970,941 shows such apparatus. It is also known to test a weld by measuring the increment of resistance change across the weld due to an increment in applied pressure across the connection, the resistance change being less in a good connection than in a bad connection. Apparatus and method of this type are disclosed in the Cherry United States Patent 3,192,474 for two opposed electrodes. Another testing method is disclosed in the copending, coassigned United States patent application by James M. Niemeyer and John D. Helms for Bond Testing Apparatus, Ser. No. 569,385, filed Aug. 1, 1966. The latter uses two opposed electrodes each of which has two current carrying members. However, these prior art methods and apparatus do not provide weld testing and control of weld testing and control of weld quality for three-electrode welding apparatus whereby leads of electronic components, made of Kovar or other suitable metals, may be welded to a comparatively inexpensive metal (e.g., copper) foil on a circuit board or the like.

SUMMARY OF THE INVENTION

Among the several objects of the invention may be noted the provision of method and apparatus for forming and testing the reliability of a weld joint wherein the quality or reliability of the joint can be determined without relying solely on factors which are independent of the quality of the weld, such as timed control of weld schedules and operator skills; the provision of such method and apparatus wherein nondestructive testing of the weld during a cycle of operation determines whether a weld of the desired quality has been formed; the provision of welding method and apparatus wherein power loss is minimized until the current reaches the weld joint area; the provision of method and apparatus for forming satisfactory welds to an inexpensive metal (i.e., copper) and assuring the quality of the joint formed; the provision of a weld joint feedback control for a welding apparatus wherein a phenomenon directly related to weld quality is utilized as the controlling parameter; the provision of method and apparatus for controlling welding operations of a three-electrode welder; and the provision of method and apparatus for controlling formation of a weld joint between a Kovar lead and a copper circuit pattern in response to the changing electrical resistance of the weld joint.

Apparatus of the invention comprises three electrodes for engaging one of two workpieces which are to be bonded together. A voltage is applied between a first one of the elecrodes (i.e., the center electrode) and the other two electrodes for developing a component signal which varies as a function of the pressure between the center electrode and the workpiece which it contacts. A current is passed between the electrodes through both workpieces in a manner such that the current (as provided by a controller) is divided, thereby minimizing the power loss until the current reaches the area of the weld joint between the two workpieces. A cyclically varying pressure exerted on the workpieces by the center electrode generates a composite signal at the electrodes which varies as a function of the resistance between the center electrode and the workpiece with which it is in contact and also as a function of the character of the bond between the workpiece. The signals are combined in a circuit to provide a signal which varies as the function of the character of the bond and the resistance change due to the cyclically varying pressure between the center electrode and the workpiece with which it is in contact and, because this signal is a function of the character of the bond, it is used as a measure or test of the quality of the bond. By comparing this signal to a reference signal, a signal directly related to the quality of the bond is obtained and fed back to a controller which regulates or operates the welding apparatus so that the welding operation functions in response to the quality of the weld produced.

BRIEF DESCRIPTION OF THE DRAWINGS

FIGURE 1 is a schematic block diagram showing welding apparatus of the invention;

Corresponding reference characters indicate corresponding parts through the several views of the drawings.

DESCRIPTION OF THE PREFERRED EMBODIMENTS

Figure 3:
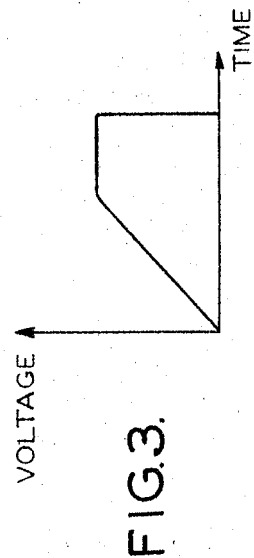
FIGURES 3–5 are diagrams of wave forms.

Referring to FIGURE 1, numerals 1 and 3 designate two workpieces which are to be welded together. Workpiece 1 may comprise a Kovar lead of a minature electronic component, such as a semiconductor network, and workpiece 3 may comprise a circuit pattern of copper foil on a circuit board. Both 1 and 3 are thin. The testing and welding apparatus comprises a center electrode 5 which is equally spaced from two outer electrodes 7 and 9. Each of the electrodes engage the workpiece 1 during welding and testing operations. The elecrodes are insulated from each other. When the apparatus is used for welding an electronic component lead to a circuit pattern, the electrodes are generally in line with each other.

Electric current for welding the workpieces together is provided by a controller generally designated 11. Controller 11 may, for example, be generally of the type disclosed in the copending, coassigned application Ser. No. 303,211, filed Aug. 14, 1963. Controller 11 is operative to apply a measured pulse of current to the primary winding P of a transformer generally designated T1. Transformer T1 has a pair of secondary windings S1 and S2. The center electrode 5 is connected to ends of both secondary windings while electrodes 7 and 9 are connected to the other ends of windings S1 and S2, respectively. As may be seen from the conventional dot notation employed in the drawings, the ends of windings S1 and S2 having the same instantaneous polarity are connected to electrodes 7 and 9 and similarly the other ends of both windings are connected to electrode 5. Thus it can be seen that windings S1 and S2 are connected to the electrodes for applying current to the workpieces and splitting this current with half of the current flowing from each of the outer electrodes 7 and 9 to the center electrode 5. By using three electrodes and dividing the current in this manner, the $I^2R$ power loss is minimized until the current reaches the weld joint area. The divided currents are recombined in the copper workpiece 3 which has a much lower resistance. Thus most of the current is concentrated in the area of the weld joint 13 which is immediately beneath the center electrode 5. As explained more fully later, the changing resistance in the weld joint 13 as it is formed is measured, thereby to test formation of the weld, and the welding apparatus is controlled in response to this changing resistance to assure formation of a high quality weld.

A source of A.C. at a relatively high frequency, herein illustrated as an oscillator OSC, is connected to the controller 11 and to a transducer 15. Transducer 15 is connected to the center electrode 5 to vibrate it so that operation of the oscillator impresses a periodically varying force on the weld joint 13 through the electrode. Until a substantially solid metallurgical joint is formed at 13, the joint electrical resistance will vary in direct response to the change in pressure produced in the joint by transducer 15. However, when a substantially solid metallurgical joint is formed there will be substantially no resistance change with the varying pressure, and the initial or before-weld resistance measurement across joint 13 will be lowered by approximately one-half. Thus by monitoring this resistance change during formation of the weld it can be determined when the joint has become a solid metallurgical joint, i.e., a high quality weld.

Figure 2:
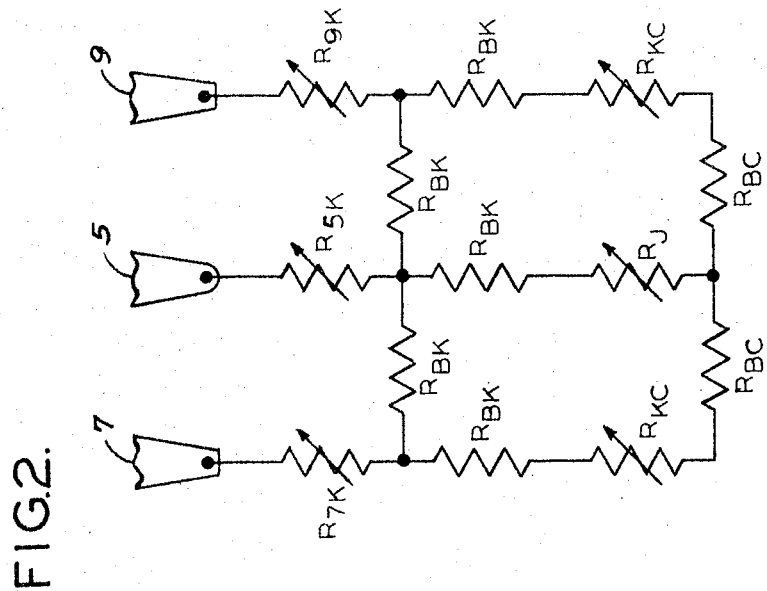
FIGURE 2 is a circuit diagram showing resistances between the welding electrodes.

The resistances between each of the electrodes 5, 7 and 9 through the workpieces and the joint 13 are measured by three detectors 17, 19 and 21. Detector 17 is connected across electrodes 5 and 7, detector 19 is connected across electrodes 5 and 9, and detector 21 is connected across electrodes 7 and 9. FIGURE 2 of the drawings shows the electrical resistances between the three electrodes, the arrows across some of the resistances indicating which of those resistances are variable during the welding process. Each reistance has been designated R and the subscript thereafter distinguishes the various resistances. The subscript letter K refers to the Kovar workpiece 1 and the letter C refers to the copper workpiece 3. The subscript KC refers to the resistance between the Kovar and copper workpieces. The subscripts 5K, 7K and 9K refer to the resistances between the Kovar workpiece and the electrodes 5, 7 and 9, respectively. The subscripts BK and BC refer to the bulk resistance through the metal layers 1 or 3, respectively. The resistances $R_{KC}$, $R_{7K}$, $R_{5K}$ and $R_{9K}$ vary in response to the force applied to the electrodes and workpieces by transducer 15. The joint resistance $R_J$ varies as a result of the transducer force and of the quality of the weld being formed, the latter variable becoming substantially constant at the time a good weld is formed.

The resistances $R_A$, $R_B$ and $R_C$ which represent the total resistances in the circuits monitored by detectors 17, 19 and 21, respectively, can be calculated as follows:

$R_A = R_{7K} + R_{BK} + R_{KC} + R_{BC} + R_J + R_{BK} + R_{5K}$
$R_B = R_{9K} + R_{BK} + R_{KC} + R_{BC} + R_J + R_{BK} + R_{5K}$
$R_C = R_{7K} + R_{BK} + R_{KC} + R_{BC} + R_{BC} + R_{KC} + R_{BK} + R_{9K}$

Thus the output of detectors 17, 19 and 21 provide signals designated A, B and C, respectively (FIGURE 1) which vary as a function of the resistances $R_A$, $R_B$ and $R_C$. The signal C is inverted in an inverter 23 and the signals A, B and C are then combined or summed in a mixing circuit or network 25 to provide a signal at D which is equal to $R_A + R_B - R_C$. By combining the formulas for resistances $R_A$, $R_B$ and $R_C$, it will be seen that the signal D is equal to $2(R_{5K} + R_{BK} + R_J)$. Thus signal D is determined by the variable resistance $R_{5K}$ between electrode 5 and workpiece 1, the constant resistance $R_{BK}$ offered by the material 1 to current passing from electrodes 7 and 9 to the lower workpiece 3, and the resistance of the joint ($R_J$) which varies during formation of the joint and then becomes a substantial constant value when a solid joint is formed. When the resistance of workpiece 1 is very high in comparison to the resistance offered by the workpiece 3, as in the case of welding a Kovar workpiece 1 to a copper workpiece 3, then the resistance $R_{BK}$ has little effect on the current path through the pieces 1 and 3 and its effect can be ignored. Where this relation between the resistances of workpieces 1, 3 does not exist, then the effect of $R_{BK}$ can be compensated for in the comparator which receives signal D at its input. For the purpose of this illustration the value $R_{BK}$ will be cancelled, thus making the signal D a function of the resistance of a joint ($R_J$) and the resistance between electrode 5 and workpiece 1 ($R_{5K}$).

A reference signal indicated at E is provided and it represents the quality or character of a satisfactory weld joint 13 between the workpieces 1 and 3. Signals D and E are compared in a comparator circuit 27, and an error signal F is provided from the comparator to controller 11. Controller 11 regulates the welding cycle in response to the feedback signal F produced from the comparator. When a high quality bond has been formed at 13 the controller stops the welding cycle. Instead of being employed to control the welding cycle through the controller, the signal D which represents the quality of the weld may be measured and displayed as described in the aforementioned patent to Cherry so that corrective steps may be manually taken by the operator of the welding apparatus. However, since the welding current itself is the bias current used for generating the signals A, B and C and since it varies according to changes in pressure and weld joint quality, thus representing the character of the weld being formed, it is preferred to use the signal D as a feedback signal to control the amount of energy applied by the controller to the weld electrodes (and thus to the weld joint 13) so that the welding cycle is automatically terminated when the satisfactory weld is achieved and before the workpieces are burned. Preferably a timing or holding circuit is employed so that the welding voltage continues for a short time interval subsequent to the time the signal F indicates that a satisfactory weld has been achieved, thereby further assuring production of a high quality weld or bond.

Figure 4:
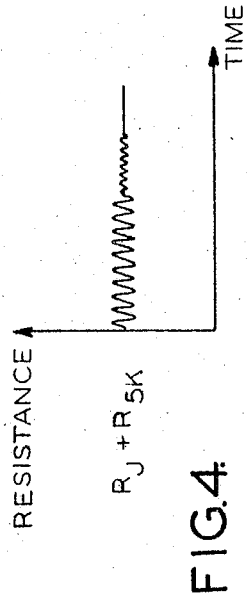
Figure 5:
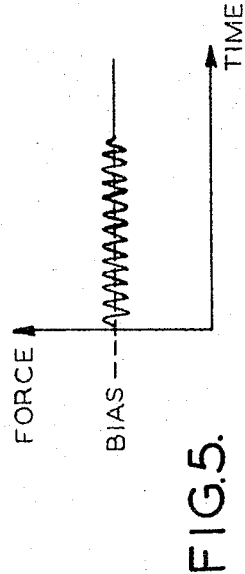

FIGURES 3–5 illustrate circuit wave forms during formation of the weld joint. The line 29 represents the time at which a weld has been formed. Like previous dynamically controlled welders, the weld electrodes are fired by the controller when the resistance of the electrodes reaches a preset level. As shown in FIGURE 3, the voltage wave form applied by controller 11 across two electrodes (either electrodes 7 and 5 or 9 and 5) comprises a ramp voltage which increases at a constant rate from the time the weld cycle starts to the time indicated by line 29 when a weld is made and the workpieces fuse together. At this time the controller 11 holds the weld voltage at a substantially constant value for a time sufficient to allow the nugget of the joint to form, and then at the end of the cycle the voltage drops abruptly to zero.

The A.C. resistance signal D (comprising $R_J + R_{5K}$) monitored by the comparator 27 varies as shown in FIGURE 4 from a comparatively large amplitude prior to the time the weld forms to a smaller amplitude subsequent to the time the weld forms. The oscillations shown to the right of line 29 are essentially a function of the resistance $R_{5K}$ which is a function of the operation of transducer 15 since the weld joint resistance $R_J$ attains substantially constant value at the time the weld bond or fusion point is reached. FIGURE 5 shows that the biasing force applied by oscillator OSC and transducer 15 to electrode 5 is of a substantially constant amplitude from the beginning of the weld cycle until its end. Parameters other than weld joint resistance can be monitored and varied by the controller to obtain the optimum conditions for welding. With the feedback control many variations of pulse shape and rise time can be combined for the best thermophysical temperature variation along the weld profile. Another test that can be performed consists of a series of pulses after the weld is made to determine the A.C. resistance of the joint. A series of go, no-go checks are made for comparison with the before-weld A.C. resistance reading.

In view of the above, it will be seen that the several objects of the invention are achieved and other advantageous results attained.

As various changes could be made in the above constructions and methods without departing from the scope of the invention, it is intended that all matters contained in the above descripion or shown in the accompanying drawings shall be interpreted as illustrative and into in a limiting sense.

What is claimed is:

1. Apparatus for bonding a pair of workpieces, said apparatus comprising:

three separate electrodes for engaging one of said workpieces, said electrodes being insulated from each other;

means for applying a biasing varying current between a first one of the electrodes and the other two electrodes, said electrodes receiving divided current from a common source of current to minimize power loss until the current reaches the area of the weld joint between the pair of workpieces;

means for exerting a cyclically varying pressure on the workpieces through said first electrode thereby to generate a plurality of A.C. signals between the electrodes at least one of which varies as a function of the resistance between said first electrode and said one workpiece and also as a function of the character of the bond between the workpieces;

means for detecting said signals;

circuit means for combining said signals to provide a combined signal which varies as a function of the character of said bond and the resistance change due to the cyclically varying pressure between said first electrode and said one workpiece, wherein the means for applying the biasing current comprises a controller for regulating the application of the biasing current, said apparatus further comprising a circuit for comparing the combined signals and a reference signal, said controller applying the biasing current to the electrodes in response to the output signal from said comparator circuit.

2. Apparatus according to claim 1 wherein said pressure exerting means comprises an oscillator and transducer, said transducer being connected to said one electrode.

3. Apparatus according to claim 1 wherein said detector means comprises three detectors, one of said detectors sensing the signal between a first pair of the electrodes, the second detector sensing the signal between a second pair of the electrodes, and the third detector sensing the signal between the other pair of the electrodes.

4. Apparatus according to claim 3 further comprising means for inverting the signal sensed by one of said detectors whereby the inverted signal is subtracted from the sum of the other two signals in the circuit means.

5. Apparatus according to claim 1 wherein the means for applying a biasing current further comprises a transformer having a primary winding energized from the controller and a pair of secondary windings connected to said electrodes for dividing the biasing current provided to said electrodes.

6. Apparatus according to claim 1 wherein the means for applying a biasing current comprises a transformer having a primary winding energized from the controller and a pair of secondary windings connected to said electrodes for dividing the biasing current provided to said electrodes.

7. A method for bonding together a pair of workpieces comprising:

establishing a biasing varying current between a first electrode and two adjacent electrodes;

exerting a cyclically varying pressure on the workpieces through the first electrode thereby to generate a plurality of A.C. signals betwen the electrodes with at least one of the signals varying as a function of the resistance between said electrode and said one workpiece and also as a function of the character of the bond between the workpieces;

detecting said signal and combining them to provide a combined signal which varies as a function of the character of said bond and the resistance change due to the cyclically varying pressure between said first electrode and said one workpiece; and comparing said combined signal with a reference signal related to the quality of the bond, and controlling application of the biasing current to the electrodes in response to said combined signal when compared to said reference signal.

8. A method according to claim 7 further comprising the step of inverting one of said A.C. signals before combining the signals so that said one of said A.C. signals is subtracted from the other signals when they are combined.

9. A method according to claim 7 further comprising controlling application of the biasing current so that a constantly increasing voltage is applied to the electrodes until a bond is made between the workpieces, and thereafter holding the voltage constant for a time interval sufficient to effect completion of the bond.

10. A method according to claim 7 further comprising controlling the biasing current in response to fluctuations in the electrical resistance of the joint being formed.

11. A method for bonding together a pair of workpieces comprising:

establishing a biasing varying current between each of two outer electrodes and a center electrode;

exerting a cyclically varying pressure on the workpieces through the center electrode thereby to generate a first A.C. signal between the center electrode and a first one of the outer electrodes, a second A.C. signal between the center electrode and the second one of the outer electrodes, and a third A.C. signal between the two outer electrodes;

detecting said signals;

inverting the third signal;

combining said signals to provide a combined signal which varies as a function of the character of the bond being formed and the resistance change due to the cyclically varying pressure between the first electrode and the workpieces it contacts; and comparing said combined signal with a reference signal related to the desired quality of the bond, and controlling application of the biasing current to the electrodes in response to said combined signal when compared to said reference signal.

12. A method according to claim 11 further comprising comparing the combined signals with a reference signal, and controlling application of the biasing current to the electrodes in response to the compared signals.

References Cited

UNITED STATES PATENTS

| | | | |
|---|---|---|---|
| 2,848,595 | 8/1958 | Van Sciver | 219—108 |
| 3,089,020 | 5/1963 | Hurlebaus | 219—86 |
| 3,192,474 | 6/1965 | Cherry | 219—109 X |
| 3,389,239 | 6/1968 | Treppa et al. | 219—110 |

JOSEPH V. TRUHE, Primary Examiner

B. A. STEIN, Assistant Examiner

U.S. Cl. X.R.

219—86, 110